(12) United States Patent
Cheung

(10) Patent No.: US 6,960,753 B2
(45) Date of Patent: Nov. 1, 2005

(54) PHOTOSENSOR ARRAYS WITH ENCODED PERMANENT INFORMATION

(75) Inventor: Nigel M-F Cheung, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 823 days.

(21) Appl. No.: 09/769,092

(22) Filed: Jan. 24, 2001

(65) Prior Publication Data

US 2002/0097455 A1 Jul. 25, 2002

(51) Int. Cl.[7] .............................................. G01J 1/42
(52) U.S. Cl. ........................... 250/208.2; 250/208.1; 257/E23.179; 438/48
(58) Field of Search ................. 250/214.1, 214 R; 257/E23.179, 98, 435, 444; 700/115; 438/48–98

(56) References Cited

U.S. PATENT DOCUMENTS

| | | | |
|---|---|---|---|
| 6,034,406 A * | 3/2000 | Kobayashi et al. | 257/435 |
| 6,161,213 A | 12/2000 | Lofstrom | |
| 6,596,981 B1 * | 7/2003 | Aswell et al. | 250/214.1 |
| 6,710,364 B2 * | 3/2004 | Guldi et al. | 250/559.44 |
| 6,737,626 B1 * | 5/2004 | Bidermann et al. | 250/208.1 |
| 6,812,058 B2 * | 11/2004 | Dennis | 438/57 |

* cited by examiner

Primary Examiner—David Porta
Assistant Examiner—Patrick J. Lee
(74) Attorney, Agent, or Firm—Augustus W. Winfield

(57) ABSTRACT

Information is encoded, within a photosensor array, into photosensors which are not used for imaging. Some information encoding photosensors are permitted to receive unimpeded light, and for other photosensors the light is at least partially blocked or filtered. Alternatively, some photosensors may be disabled. When the photosensors are exposed to light, the resulting photosensor signals provide information. Alternatively, some photosensors may accumulate charge in the absence of light, and the resulting photosensor signals in the absence of light provide information. The information can be binary, or multiple-bit per pixel. Information can also be encoded into each individual color channel. Identification of vendor, part type, or other information can be encoded.

16 Claims, 2 Drawing Sheets

PHOTOSENSOR ARRAYS WITH ENCODED PERMANENT INFORMATION

FIELD OF INVENTION

This invention relates generally to photosensor arrays used for optical image scanners and cameras, and more specifically to encoding information about the photosensor arrays within the photosensors.

BACKGROUND OF THE INVENTION

Digital cameras, optical image scanners, digital copiers, digital facsimile machines, etc. all use arrays of photosensors to convert a visible image into an electronic form suitable for copying, storing, or processing by a computer. Photosensor arrays, particularly color photosensor arrays, commonly have performance parameters that are characterized before product manufacturing. The parameters, or appropriate compensation values, are commonly stored in non-volatile memory within imaging devices using the photosensor arrays. For example, color measurement values with three non-ideal filter spectral bands can be linearly transformed, using a three by three color transformation matrix, into measurement values that approximate what is needed for the human visual system. If the filter characteristics are consistent from array to array, the filters can be characterized once, and the resulting color transformation matrix values can be stored in non-volatile memory within the imaging device. However, filter characteristics, or other parameters of interest, may vary from vendor to vendor, or may vary among arrays from different part families. There is a general need to be able to use parts from different vendors, or parts from one vendor but from different part families. Accordingly, there is a need for electronic identification of a photosensor array, so that an imaging device using the array can determine which parameters or compensation values are appropriate for the array.

SUMMARY OF THE INVENTION

Information is encoded into photosensors, within a photosensor array. The photosensors used for encoding information are not used for imaging. Some information encoding photosensors are permitted to receive unimpeded light, and for other photosensors the light is at least partially blocked or filtered. Alternatively, some photosensors may be disabled. When the photosensors are exposed to light, the resulting disabled photosensor signals provide information. As still another alternative, some photosensors may be modified so that a capacitance is charged even in the absence of light. When the photosensor array is discharged and kept dark, voltages from the modified photosensors provide information. The information can be binary, or multiple-bit per pixel. Information can also be encoded into each individual color channel. Identification of vendor, part type, or other information can be encoded.

DETAILED DESCRIPTION OF THE PREFERRED EMBODIMENT OF THE INVENTION

Figure 1:
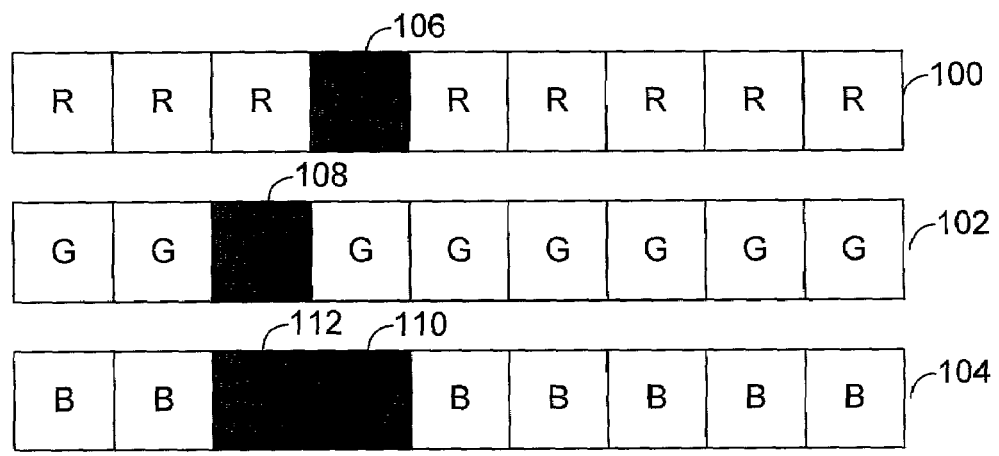
FIG. 1 is a block diagram of an example of a photosensor assembly with line arrays, with encoded information in accordance with the invention.

FIG. 1 illustrates a representative example of a photosensor array that might be used, for example, for document scanners and digital color copiers. In the example of FIG. 1, there are three line arrays of photosensors. Line array 100 receives light having wavelengths in the red band, line array 102 receives light having wavelengths in the green band, and line array 104 receives light having wavelengths in the blue band. The exact configuration is not relevant to the invention. For example, there may be only a single row of photosensors receiving all human visible wavelengths (for black and white copying or facsimile), or there may be more than three rows, or the choice of bands of wavelengths may be different. Photosensor arrays commonly include circuitry to convert light intensity at each photosensor to a digitized value.

Line arrays for document scanners and digital copiers commonly have on the order of 10,000 photosensors per line array. It is common for a few photosensors at one or both ends of a line array to be used for various calibration purposes rather than for imaging. In FIG. 1, four photosensors at one end of each row are used for information encoding rather than for imaging. The number, arrangement, and location of the information encoding photosensors is for illustration only, and may vary as discussed below.

As depicted in FIG. 1, photosensors 106, 108, 110, and 112 may, for example, be covered with an opaque material to block light from reaching the photosensors. An example of a suitable material for blocking light is a layer of aluminum or other metal. If the photosensor assembly in FIG. 1 is exposed to light, photosensors 106, 108, 110 and 112 will provide signals (intensity values) that are different than the other photosensors that are not blocked. Assume that the four photosensors at the extreme left end of each line array are used to encode information, with the least significant bit in the column corresponding to photosensors 106 and 110. Further assume that a high intensity measurement is interpreted as binary "zero", and that a low intensity measurement is interpreted as binary "one." Row 100 then encodes a value of decimal one, row 102 encodes a value of decimal two, and row 104 encodes a value of decimal three.

There are many suitable variations. For example, information could be encoded in columns instead of rows. For example, information could be encoded in the column corresponding to photosensors 106 and 110. If photosensor 110 represents the least significant bit, then the column encodes a value of decimal five. Only one row or column could be used. Finally, the arrangement depicted in FIG. 1 could be interpreted as three four-bit binary numbers, or the bits could be concatenated to form one 12-bit binary number.

Alternatively, information may be encoded as multiple bits per pixel. For example, instead of an opaque material, photosensor 106 may be covered with a filter (dye, pigment, etc.) that absorbs one of: 0%, 25%, 50%, 75%, or 100% of the light impinging on photosensor 110. Alternatively, an opaque material may only partially cover the photosensor, so that for example, 0%, 25%, 50%, 75%, or 100% of the light reaches the photosensor. The digitized signal value from photosensor 106 is then quantized into one of five levels.

In the above discussion of FIG. 1, it is assumed that information is encoded as a result of blocking or filtering light to a photosensor. As an alternative, selected photosensors could be disabled as part of the integrated circuit fabrication process, or as a procedure after fabrication. For example, an essential structure such as a metal electrode could be left off during manufacturing, or a connection to an electrode could be broken after manufacturing. Disabled photosensors would provide no signal, even when illuminated.

Figure 2:
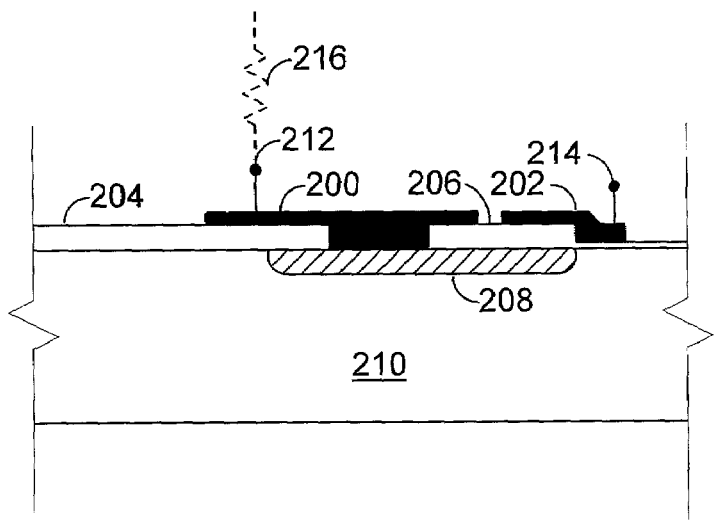
FIG. 2 is block diagram of a photosensor modified to charge a capacitance, even in the absence of light, in accordance with the invention.

As still another alternative, some photosensors may be fabricated so that they always accumulate charge, or can be controlled to accumulate charge, even though they are not exposed to light. FIG. 2 illustrates a structure in which a charge packet can be controlled to accumulate even in the absence of light. CCD arrays, in addition to being used in photosensor arrays, are also used as analog delay lines and for memory devices. When used as a delay line or memory device, an input diode is used to charge the first stage. The structure in FIG. 2 is essentially the same as the input stage for a CCD delay line or memory device. In FIG. 2, there are two metal electrodes (200, 202), two regions of oxide layer (204, 206), an N+ diffusion 208, and a p-type bulk silicon substrate 210. Electrode 200, the N+ diffusion 208, and the bulk substrate 210 form a MOS input diode. Electrode 202, oxide layer 206, and the portion of the bulk substrate 210 that is not under the diffusion 208, form a CCD stage. When input 214 is high, lowering input 212 causes charge to accumulate in a depletion region under electrode 202. As a result, the CCD stage can be controlled to accumulate charge, even in the absence of light. If all CCD stages are discharged, and then left with no exposure to light, after a short period of time, CCD stages modified as in FIG. 2 will have accumulated charge, and nonmodified CCD stages will have only noise-level charge. It may be desirable to control the rate at which the modified CCD stage charges. Accordingly, in FIG. 2, an optional series resistor 216 may be used to control the rate at which charge accumulates in the absence of light. The series resistor may be external to the integrated circuit, for example, one resistor for all modified CCD stages, or the resistor may be fabricated as part of the integrated circuit. As an alternative, a charge drain may be implemented in parallel with the CCD capacitance. It is common in CCD devices to provide an overflow drain (either lateral or vertical) to drain excess charge. The charge drain may be controlled to limit the rate at which the CCD capacitance is charged, or may be controlled to discharge the CCD capacitance at a controlled rate, or may be controlled to discharge any charge that exceeds a predetermined threshold.

A working illuminated photosensor may provide a high signal magnitude relative to a disabled photosensor, or relative to a photosensor with blocked light. Alternatively, some photosensor technologies provide inverted signals. For example, the photosensors may be charged in the dark, and then exposure to light discharges the photosensors. For arrays with modified sensors as in FIG. 2, working photosensors will not accumulate charge in the dark, whereas modified photosensors will accumulate charge in the dark. Accordingly, what is important is that a signal level from a disabled photosensor, or a photosensor with at least partially blocked light, or a modified photosensor, can be distinguished from a signal level expected from a working photosensor. What is important is that information is detectable in the signals returning from the photosensor array, not the details of how the signals are modified or suppressed.

Figure 3:
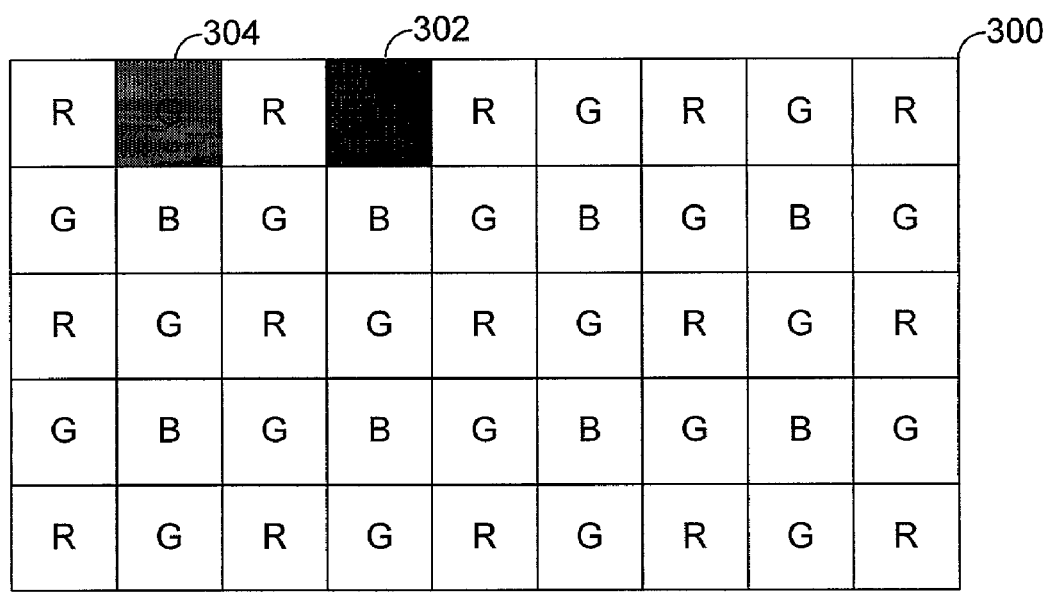
FIG. 3 is a block diagram of an example of a photosensor assembly with a two dimensional array, with encoded information in accordance with the invention.

FIG. 3 illustrates a representative example of a two-dimensional photosensor array that might be used for digital still cameras or digital video cameras. In the example of FIG. 3, color filters in a photosensor array 300 are arranged in a mosaic pattern, commonly called a Bayer pattern after B. E. Bayer of Eastman Kodak. A photosensor array for a digital still camera might comprise on the order of 3,000,000 photosensors. As depicted in FIG. 3, a few photosensors, in one edge row or column, may be dedicated to information encoding instead of imaging. In FIG. 3, photosensors 302 and 304 are covered with an opaque material to block light from reaching the photosensors. If photosensor 302 represents the least significant bit, then the digitized intensity values encode a value of digital five. Again, different values could be encoded into different colors, filters could be used to encode multiple bits per pixel, disabling of photosensors could be used instead of blocking light, and the photosensors could be modified to accumulate charge even in the absence of light.

Preferably, the information is encoded by the manufacturer of the photosensor assembly. Then, for the manufacturer of the imaging product using the photosensor array, the information is permanently available to a computer processor, either within the imaging product or to a computer connected to the imaging product. A typical use of the encoded information would include reading of the information during power-on initialization, and using the information to determine which of several alternative sets of data or firmware to use. An example of useful information is a number that uniquely identifies the type (vendor, configuration, etc.) of the photosensor assembly, so that the manufacturer of the imaging product using the photosensor assembly can interchange multiple non-identical photosensor assemblies.

For encoding using light blocking or disabled photosensors, the encoding photosensors must be illuminated in order to read the encoded information. For binary encoding, the illumination intensity is not important as long as all encoding photosensors receive approximately the same intensity, so that signal differences can be detected. For multiple-bit per pixel encoding, the intensity needs to be consistent or known. For example, one photosensor that is not blocked or filtered could be used to measure illumination intensity, and digitized intensities from the filtered photosensors could be ratioed to the digitized intensity from the intensity measurement photosensor. Document scanners, copiers, and facsimile machines typically include internal illumination. It is also common to provide a calibration strip, along one edge of a platen supporting a document, which is used to provide photosensor sensitivity calibration before scanning (called photo-response-non-uniformity, or PRNU, calibration). The information encoding photosensors may be read during PRNU calibration. Digital cameras may include a light-emitting-diode or other illumination for various control indicators (for example, an "ON/OFF" indicator). If necessary, an internal light source may have to be provided. Light from any internal light source could be routed to the encoding photosensors, using a light pipe or other suitable means, to enable reading of the encoded information, even if there is no external illumination.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A photosensor assembly, comprising:
a plurality of photosensors, including at least one selected photosensor for which light is at least partially impeded from impinging onto the selected photosensor, and when the photosensor assembly is illuminated, identification information unique to a type of photosensor assembly is encoded in resulting signals from the photosensor assembly including signals from the selected photosensor.

2. The photosensor assembly of claim 1, wherein the light is substantially blocked from impinging onto the selected photosensor.

3. The photosensor assembly of claim 1, further comprising:
a filter, partially impeding light from impinging onto the selected photosensor.

4. The photosensor assembly of claim 3, wherein the filter absorbs light by a percentage from a group of preselected percentages.

5. The photosensor assembly of claim 1, wherein the light is partially impeded by a percentage from a group of preselected percentages.

6. A photosensor assembly, comprising:
at least one selected photosensor that is intentionally disabled, so that when the photosensor assembly is illuminated, information identifying the photosensor assembly as one particular type of photosensor assembly is encoded in resulting signals from the photosensor assembly including signals from the selected photosensor.

7. A method of permanently encoding information in a photosensor assembly, comprising:
intentionally causing a signal magnitude, from at least one selected photosensor, when illuminated at a known intensity, to be different than an expected magnitude, so that the resulting signals from the photosensor assembly, including signals from the selected photosensor, form a pattern suitable to distinguish the photosensor assembly as a particular type of photosensor assembly.

8. The method of claim 7, the step of intentionally causing further comprising:
blocking substantially all light from impinging onto the selected photosensor.

9. The method of claim 7, the step of intentionally causing further comprising:
blocking the light impinging onto the selected photosensor by a percentage from a group of preselected percentages.

10. The method of claim 7, the step of intentionally causing further comprising:
filtering light impinging onto the information photosensor.

11. The method of claim 10, the step of filtering further comprising:
absorbing light by a percentage from a group of preselected percentages.

12. The method of claim 7, the step of intentionally causing further comprising:
disabling the selected photosensor.

13. A method of permanently encoding information in a photosensor assembly, comprising:
intentionally providing at least one first photosensor that accumulates significant charge even when no illumination is present;
providing at least one second photosensor that accumulates significant charge when illumination is present and accumulates insignificant charge when no illumination is present; and
wherein a signal magnitude, from the first photosensor, is different than an expected signal magnitude from the second photo sensor, when no illumination is present.

14. A photosensor assembly comprising:
a plurality of photosensors that have been modified such that photosensor assembly source identification information is encoded in the modifications.

15. A photosensor assembly comprising:
a plurality of photosensors that have been modified such that photosensor assembly type identification information is encoded in the modifications.

16. A method, comprising:
receiving signals from selected photosensors in a photosensor assembly; and,
detecting, in the signals, a pattern uniquely identifying the photosensor assembly as a particular type of photosensor assembly.

* * * * *

UNITED STATES PATENT AND TRADEMARK OFFICE
CERTIFICATE OF CORRECTION

PATENT NO. : 6,960,753 B2  Page 1 of 1
APPLICATION NO. : 09/769092
DATED : November 1, 2005
INVENTOR(S) : Nigel M-F Cheung It is certified that error appears in the above-identified patent and that said Letters Patent is hereby corrected as shown below:

In column 6, line 31, in Claim 13, delete "photo sensor" and insert -- photosensor --, therefor.

Signed and Sealed this

Twenty-fifth Day of August, 2009

David J. Kappos
*Director of the United States Patent and Trademark Office*